(12) United States Patent
Wu

(10) Patent No.: US 6,981,270 B2
(45) Date of Patent: Dec. 27, 2005

(54) PLUNGER-LATCH MECHANISM FOR OPTICAL DISK DRIVE

(75) Inventor: Jen-Chen Wu, Yunlin (TW)

(73) Assignee: Micro-Star Int'l Co., Ltd., Taipei Hsien (TW)

( * ) Notice: Subject to any disclaimer, the term of this patent is extended or adjusted under 35 U.S.C. 154(b) by 24 days.

(21) Appl. No.: 10/351,370

(22) Filed: Jan. 27, 2003

(65) Prior Publication Data

US 2004/0205787 A1 Oct. 14, 2004

(51) Int. Cl.$^7$ .......................... G11B 17/03; G11B 17/04; G11B 33/02

(52) U.S. Cl. ...................................... 720/610

(58) Field of Search ............................ 369/75.2, 75.21; 720/610, 637, 601, 600

(56) References Cited

U.S. PATENT DOCUMENTS

2004/0004927 A1 * 1/2004 Ahn .......................... 369/75.21

FOREIGN PATENT DOCUMENTS

JP         2004-303289 A   * 10/2004

* cited by examiner

Primary Examiner—Julie Anne Watko

(57) ABSTRACT

A plunger-latch mechanism for an optical disk drive has a plunger type solenoid, a plurality of resilient members, a connecting member, a latch, a wedge and a rotary member. While the tray is pushed into the casing, a mutual movement between the rotary member and the latch cause the latch rotate to be locked by the wedge. Since the plunger type solenoid opens the latch without resistance to the resilient force of the resilient members, the electric power required to open the latch is greatly reduced. Moreover, the locking force between the latch and the wedge is significantly increased. Therefore, the performance of the plunger-latch mechanism for optical disk drive is improved.

1 Claim, 9 Drawing Sheets

PLUNGER-LATCH MECHANISM FOR OPTICAL DISK DRIVE

BACKGROUND OF THE INVENTION

1. Field of the Invention

The invention relates to a plunger-latch mechanism for an optical disk drive, and particularly, to a plunger-latch mechanism that requires reduced electric power to open the optical disk drive, and keeps a tray of the optical disk drive stable while the optical disk drive is in a closed state.

2. Description of the Related Art

A tray control unit of a conventional optical disk drive including a tray 4 and a casing 1 is controlled by a latch mechanism. This latch mechanism usually includes a solenoid 7, a compression spring 8, a latch 10, and a manually actuated slider 10a. The solenoid 7 generates a magnetic force sufficient to overcome a resilient force of the spring, so that the latch 10 is pushed away from a wedge 13 of the latch 10 to slidably separate the tray 4 from the casing 1. When the tray 4 is outwardly pulled out to an outmost position from the optical disk drive and after an optical disk has been placed thereon, the tray 4 then is retracted inside the optical disk drive. Information then is read or written on the optical disk via a read/write head 3.

Conventionally, a solenoid type latch mechanism, including the solenoid 7, the compression spring 8, the latch 10 and the manually actuated slider 10a, is mounted at a side of the tray 4. When the latch 10 is in a closed state, the solenoid 7 has no magnetic flux. At this time, the locking force comes from the resilient force. As illustrated, the latch 10 and the wedge 13 are locked by the compression spring 8 between a connecting rod 7a of the solenoid 7 and the latch 10. The wedge 13 is mounted on the casing 1.

If the latch 10 is to be opened, the magnetic force generated after the solenoid 7 is electrified must be sufficient to resist to the resilient force of the compression spring 8, as illustrated in FIG. 3, to push the latch 10 away from the wedge 13. However, the conventional latch mechanism of the optical disk drive has the following disadvantages:

1. Low electric current loss is an important factor in designing the optical disk drive, especially a thin optical disk drive used within a laptop. The conventional solenoid type latch mechanism requires a sufficiently large electric current to resist the resilient force of the compression spring 8, which results in considerable consumption of electric power.

2. The conventional solenoid type latch mechanism has a locking force that is usually not sufficient to endure shock during transportation, because the latch 10 is not firmly fastened to the wedge 13.

SUMMARY OF THE INVENTION

It is therefore a principal object of the invention to provide a plunger-latch mechanism for an optical disk drive that can overcome the above drawbacks of the prior art.

To accomplish the above and other objectives, a plunger-latch mechanism includes a plunger type solenoid, three resilient members, a latch, a connecting member, and a rotary member. The plunger type solenoid has a permanent magnetic force of about 350 g, which is much higher than a conventional solenoid that usually has a magnetic force of less than about 100 g. When the plunger-latch mechanism of the invention is in a closed state, a first resilient member provides a resilient force (about 200 g) to lock the latch via the wedge. When the latch is to be opened, the plunger type solenoid is demagnetized. The second resilient member releases its energy to cause rotation of the connecting member. The poking piece of the connecting member abuts a second bend of the latch to make the latch rotate and separate from the wedge. At this time, a restoring resilient member releases its energy to push out the tray. In specific situations, such as a power failure, a user presses a first bend, which is optionally provided with a manually actuated member, through a through hole (not shown) on an operational panel to open the latch.

While the tray is withdrawn into the casing, a boss on the rotary member abuts the wedge to make the rotary member abut the connecting arm. The connecting member then causes the adjustable rod to retract to its locked state. Since the plunger type solenoid can open the latch without resisting the resilient force of the resilient member, the electric power required to open the latch is greatly reduced. Moreover, the locking force between the latch and the wedge is significantly increased, from 100 g to 200 g. Therefore, the performance of the plunger-latch mechanism for optical disk drive is improved.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention.

A brief introduction of the drawings is as follows.

DETAILED DESCRIPTION OF THE EMBODIMENTS

Figure 1:
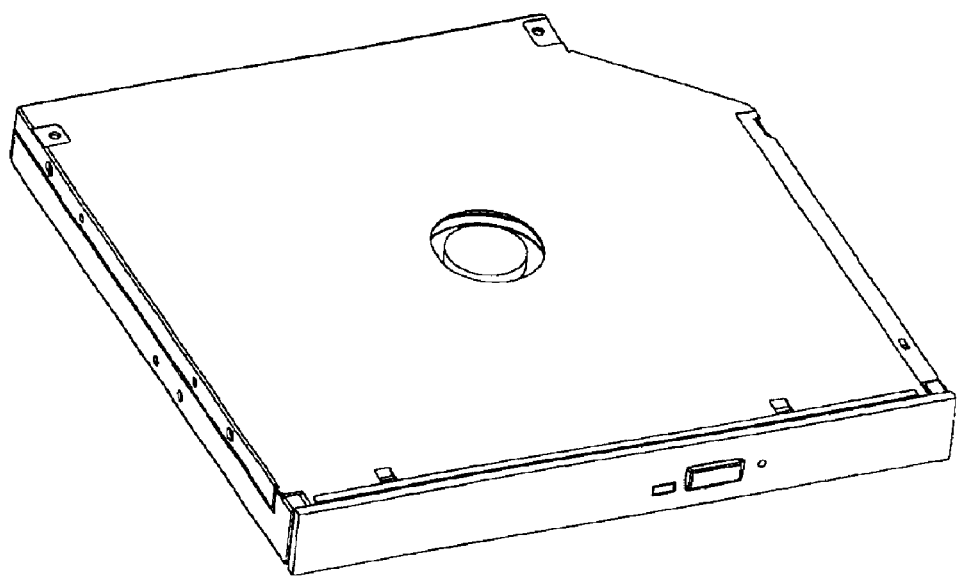
FIG. 1 is a perspective view of a conventional optical disk drive.
Figure 2:
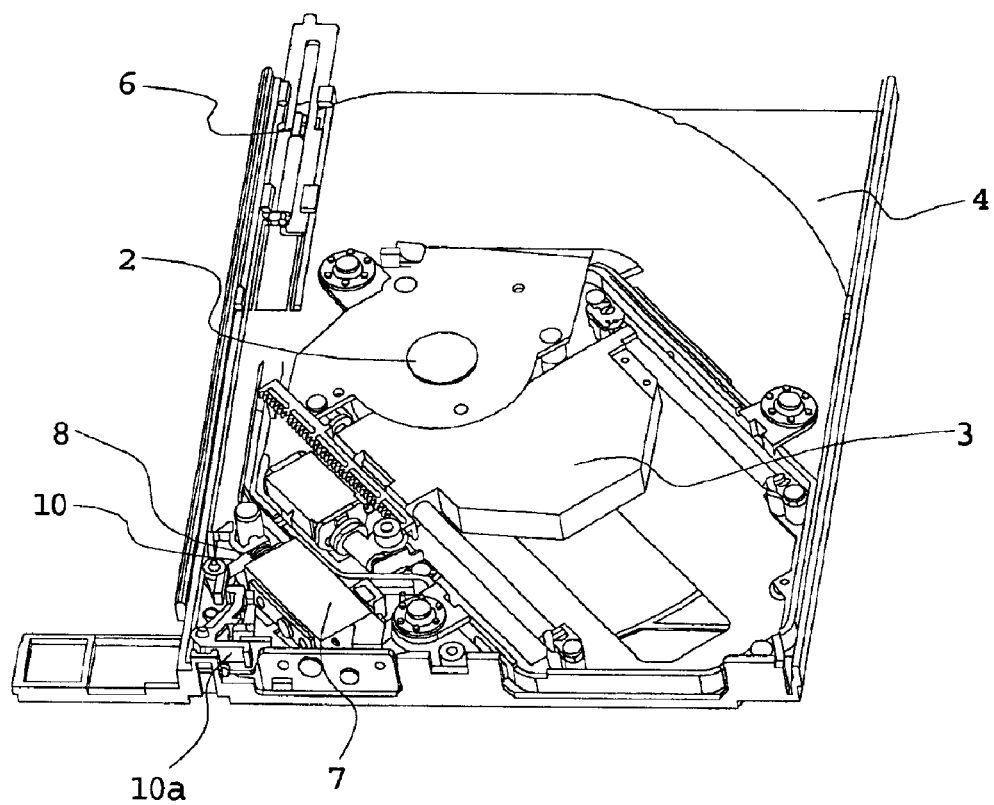
FIG. 2 is a schematic view of a conventional latch mechanism for an optical disk drive.
Figure 3:
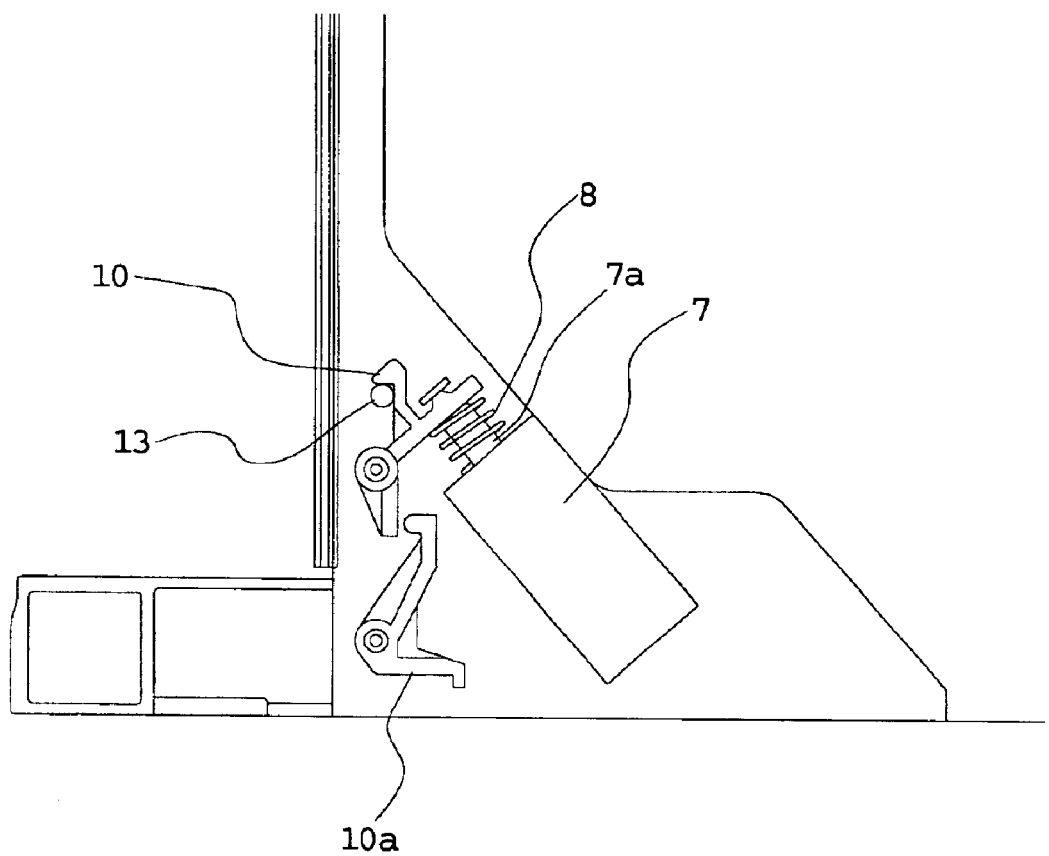
FIG. 3 is a schematic view illustrating a conventional latch mechanism for an optical disk drive in a closed state.
Figure 4:
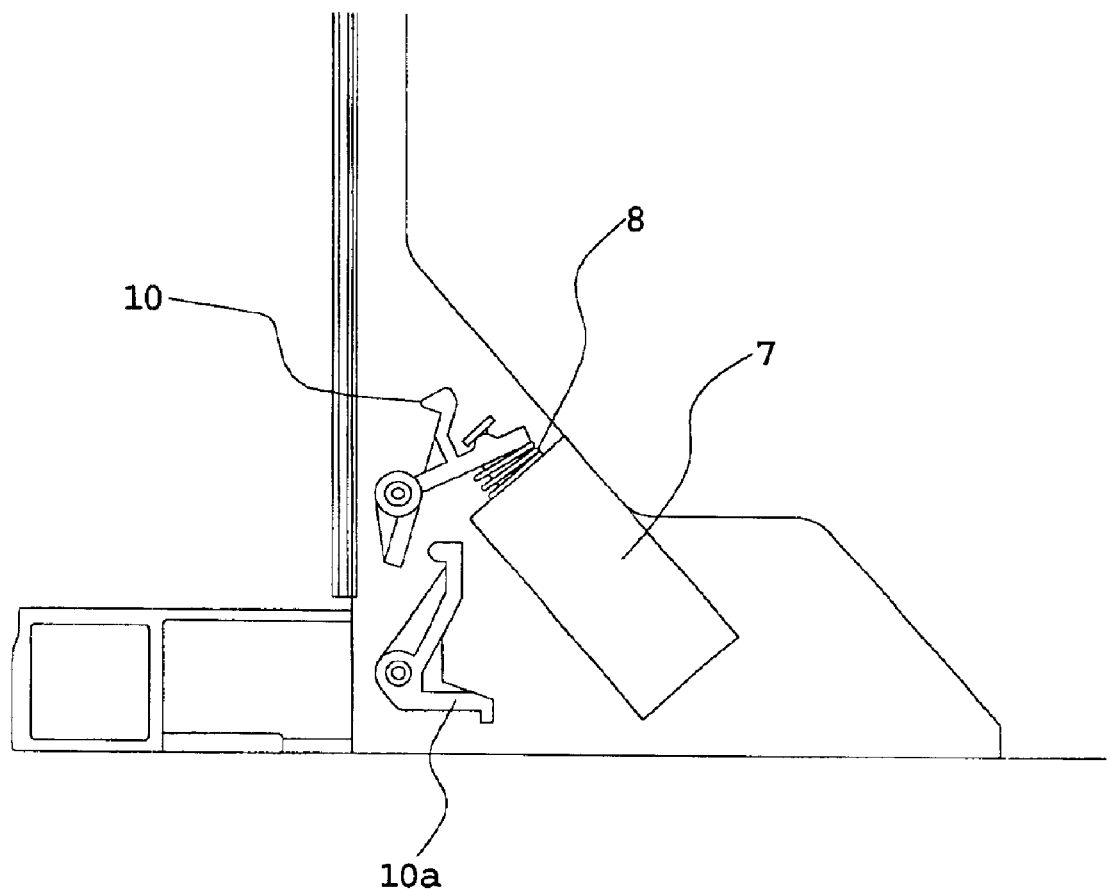
FIG. 4 is a schematic view illustrating a conventional latch mechanism for an optical disk drive in an open state.

Wherever possible in the following description, like reference numerals will refer to like elements and parts unless otherwise illustrated.

Figure 5:
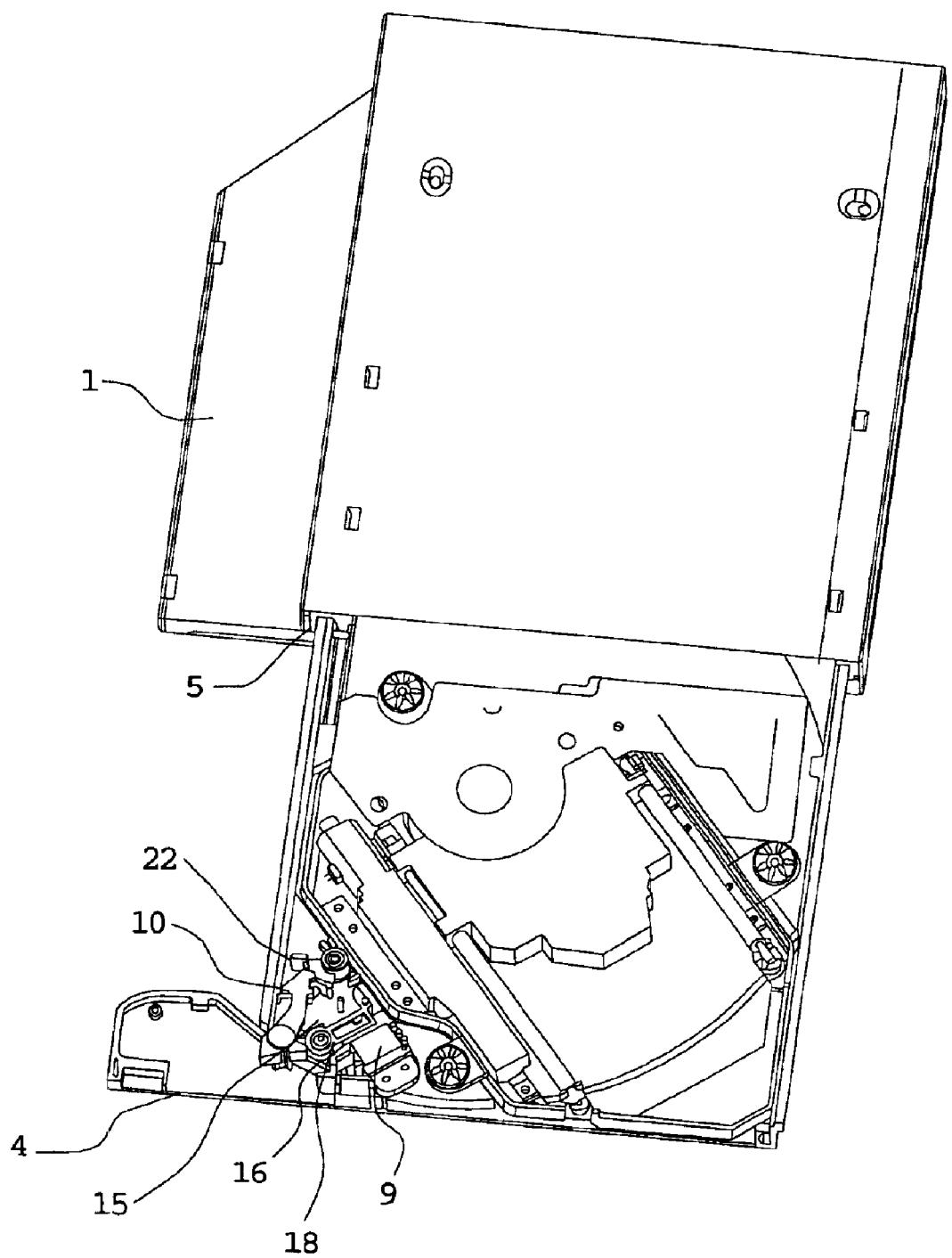
FIG. 5 is a schematic, perspective view of a plunger-latch mechanism for an optical disk drive according to one embodiment of the invention.
Figure 6:
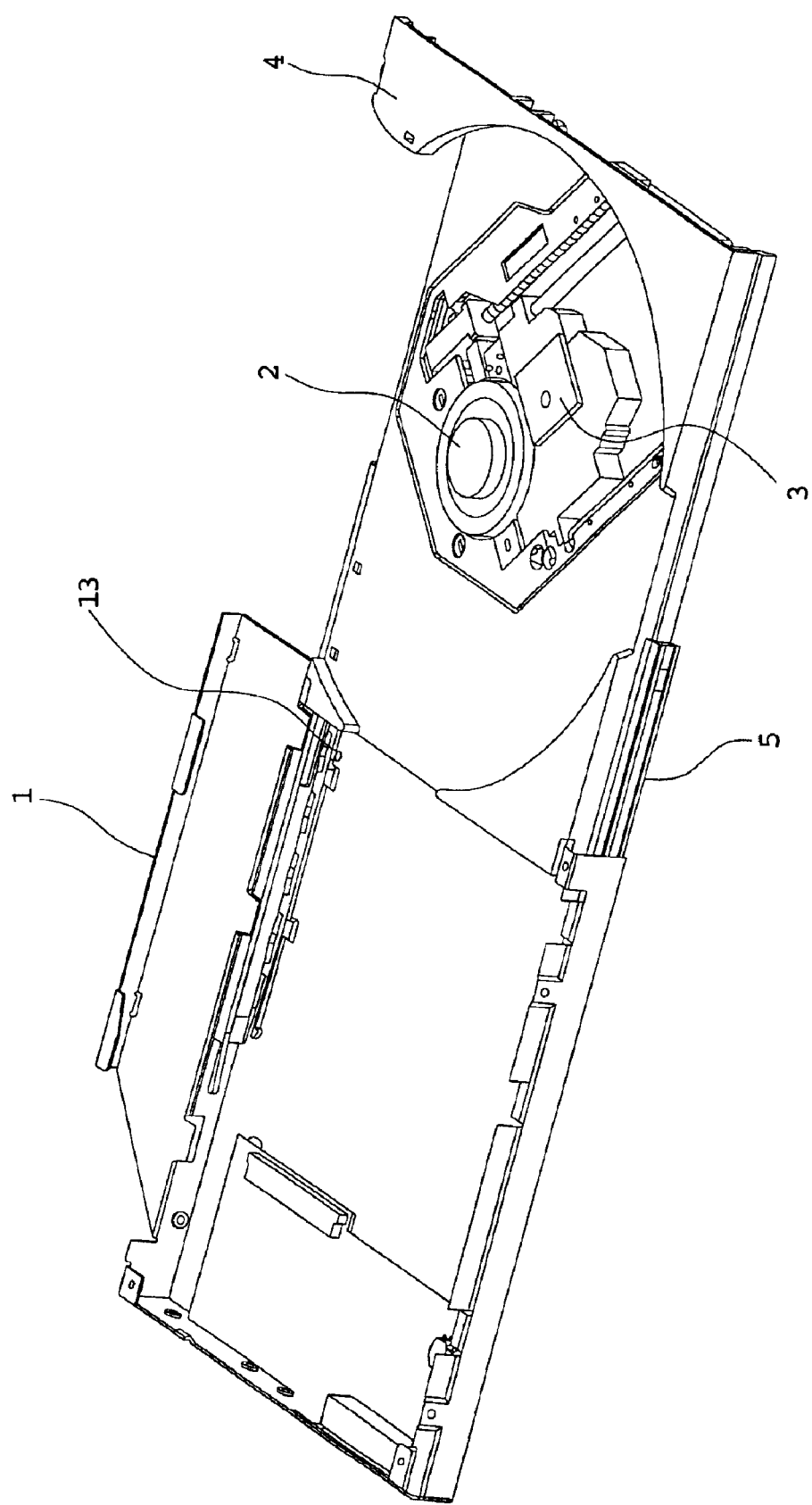
FIG. 6 is a schematic view illustrating an optical disk drive in an open state according to one embodiment of the invention.
Figure 7:
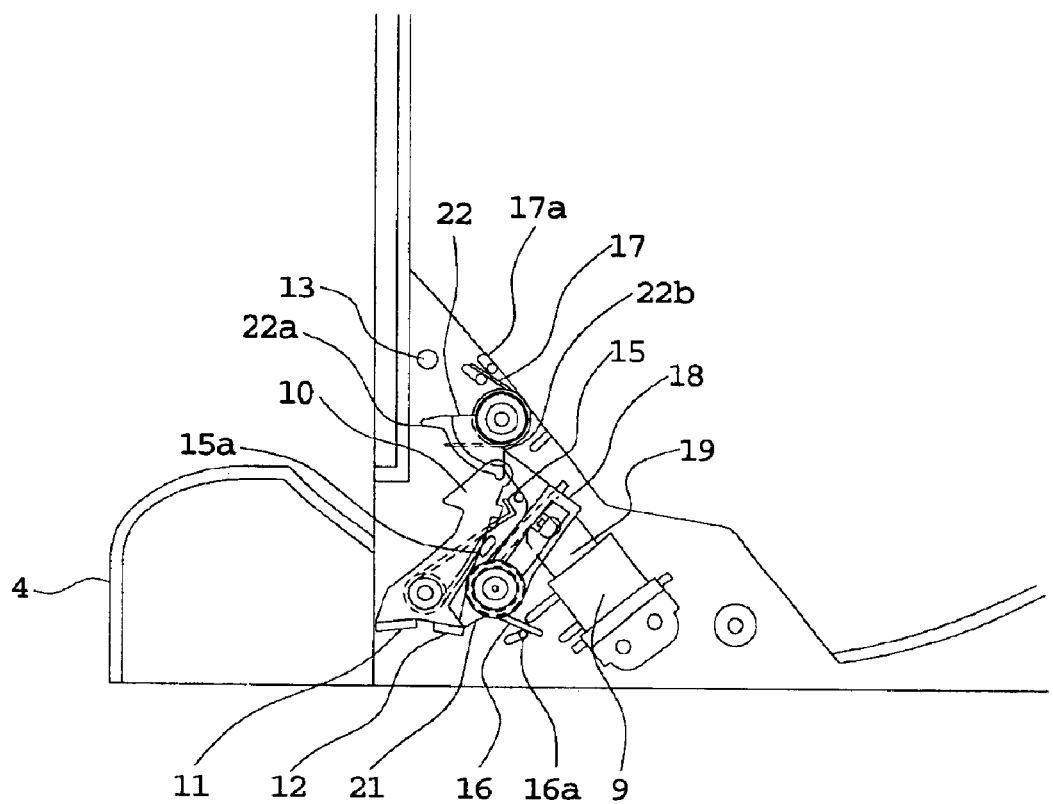
FIG. 7 is a schematic view illustrating a closing operation of a plunger-latch mechanism according to one embodiment of the invention.
Figure 8:
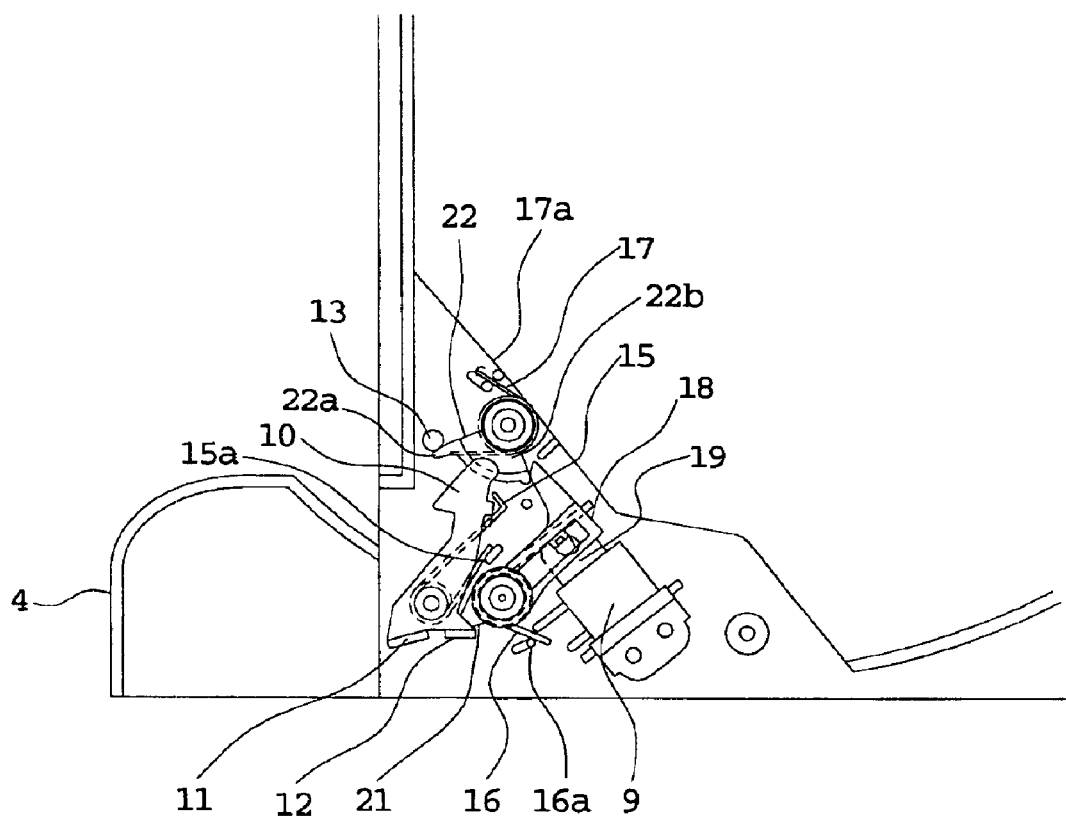
FIG. 8 is a schematic view illustrating an opening operation of a plunger-latch mechanism according to one embodiment of the invention.
Figure 9:
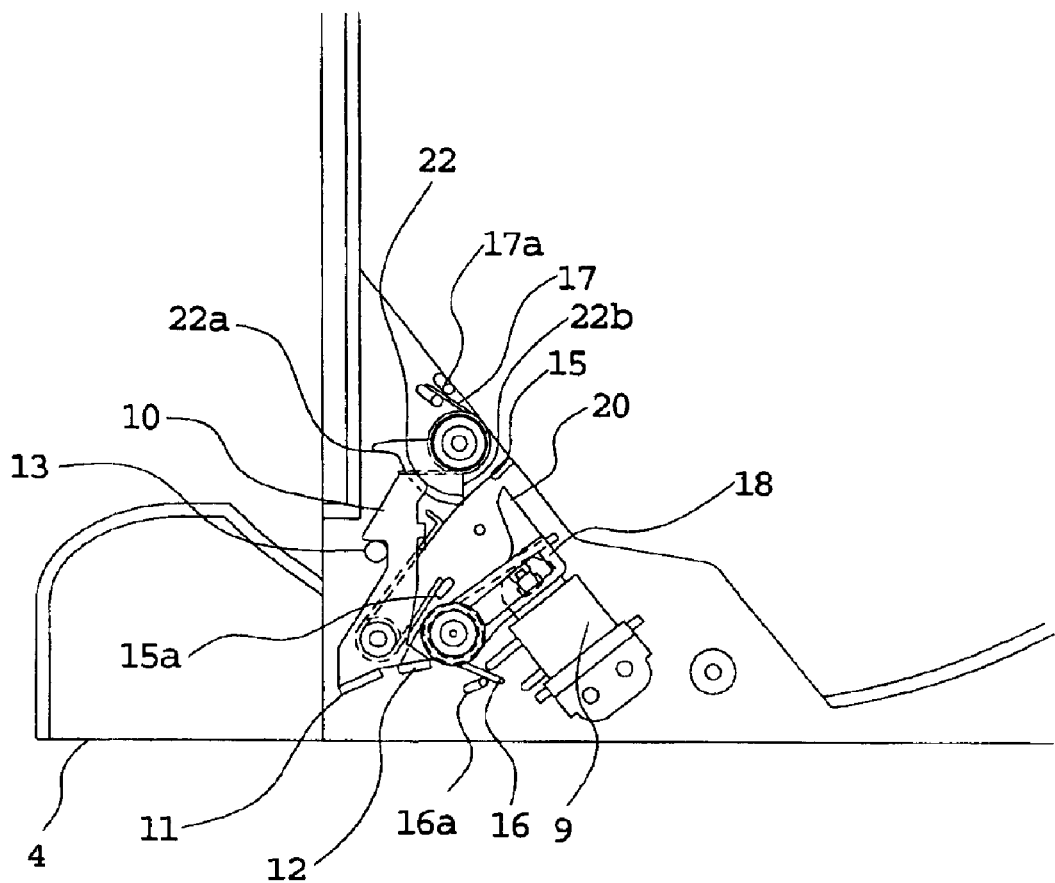
FIG. 9 is a schematic view illustrating an opening operation of a plunger-latch mechanism according to another embodiment of the invention.

Referring to FIG. 5, the invention provides a plunger-latch mechanism for an optical disk drive that includes a casing 1, a shaft motor 2, a read/write head 3, a tray 4 and two sliding mechanisms 5. The plunger-latch mechanism is installed at a front side of the tray 4 to slide in and out along the sliding mechanisms 5 in the casing 1.

The plunger-latch mechanism of the invention includes a plunger type solenoid 9 that has a permanent magnetic force of more than 100 g (as it is well known in the art), typically 350 g. The plunger type solenoid 9 is connected to an adjustable rod 19 that is inserted in a connecting member 18 along a lengthwise direction of the plunger type solenoid 9.

A second resilient member 16 such as spring is pivotally connected onto the connecting member 18, and an end of the second resilient member 16 opposite the connecting member 18 is fixed to a second block 16a to resiliently restrict the connecting member 18. A connecting arm 20 extends from one end of the connecting member 18, and the other end of the connecting member 18 is formed with a poking piece 21 that abuts a second bend 12 pivotally connected to a latch 10. A first resilient member 15 such as a spring is pivotally connected on the latch 10, with an end of the first resilient member 15 being fixed on the first block 15a to resiliently restrict the latch 10.

When the tray 4 is pushed into the casing 1, the magnetism of the movable electromagnet valve 9 does not disappear although the movable electromagnet valve 9 is not electrified. When the adjustable rod 19 retracts, the connecting member 18 is drawn back to store the energy of the second resilient member 16. The poking piece 21 of the connecting member 18 accordingly turns upward. Since the poking piece 21 does not abut the second bend 12 and the energy of the first resilient member 15 is released, the latch 10 rotates counterclockwise to lock a wedge 13.

The connecting arm 20 is pivotally connected to a rotary member 22 to which a third resilient member 17 such as a spring is fixed. One end of the third resilient member 17 opposite the rotary member 22 is fixed on a third block 17a. While the tray 4 is pushed into the casing 1, the mutual movement between the rotary member and the latch cause the latch to rotate in a manner so as to be locked by the wedge. A boss 22a on the rotary member 22 abuts the wedge 13 and both rotate counterclockwise. A returning surface 22b of the rotary member 22 abuts the connecting arm 20 after the connecting member 18 is rotated.

The connecting arm 20 causes the adjustable rod 19 of the plunger type solenoid 9 to return to its locked position. The rotary member 22 returns to its initial position as a result of retracting of the third resilient member 17. When the optical disk drive receives a power-on signal to electrify, the plunger type solenoid 9 is demagnetized, and the second resilient member 16 releases its energy to push the wedge 13 away from the latch 10 while the first resilient member 15 stores its energy for next locking of the latch 10.

The electric power required to generate the electromagnetic force necessary to resist to the resilient force of the spring is far larger than that required to demagnetize the plunger type solenoid 9. In addition to the improvement of the invention in reducing the electric power required to open the latch, the locking force between the latch and the wedge is also significantly improved, such as from 100 g to 200 g. The performance of the plunger-latch mechanism of the invention therefore is improved.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A plunger-latch mechanism for an optical disk drive, comprising:

a plunger type solenoid providing a permanent magnetic force, wherein the plunger type solenoid has an adjustable rod;

a connecting member to which the adjustable rod is connected, and the connecting member has a connecting arm extended from one end thereof and a poking piece formed on another end thereof;

a latch having a bent portion, which the poking piece abuts against, and to a first resilient member;

wherein said first resilient member is pivotally connected to a predetermined position of the latch;

wherein a second resilient member is pivotally connected to a predetermined position of the connecting member;

a wedge mounted on a casing of the optical disk drive; and a rotary member, having a boss;

while a tray of the optical disk drive is pushed into the casing, the connecting member drives the latch to rotate and to be locked by the wedge;

wherein the boss of the rotary member abuts the wedge and both boss and wedge rotate, and a returning surface of the rotary member abuts the connecting arm and both rotate to make the connecting member rotate and abut the rotary member, which drives the adjustable rod to retract; and when the optical disk drive receives a power-on signal to electrify, the plunger type solenoid is demagnetized, and the second resilient member releases resilient energy to push the wedge away from the latch while the first resilient member stores resilient energy for next locking of the latch.

* * * * *